UNITED STATES PATENT OFFICE.

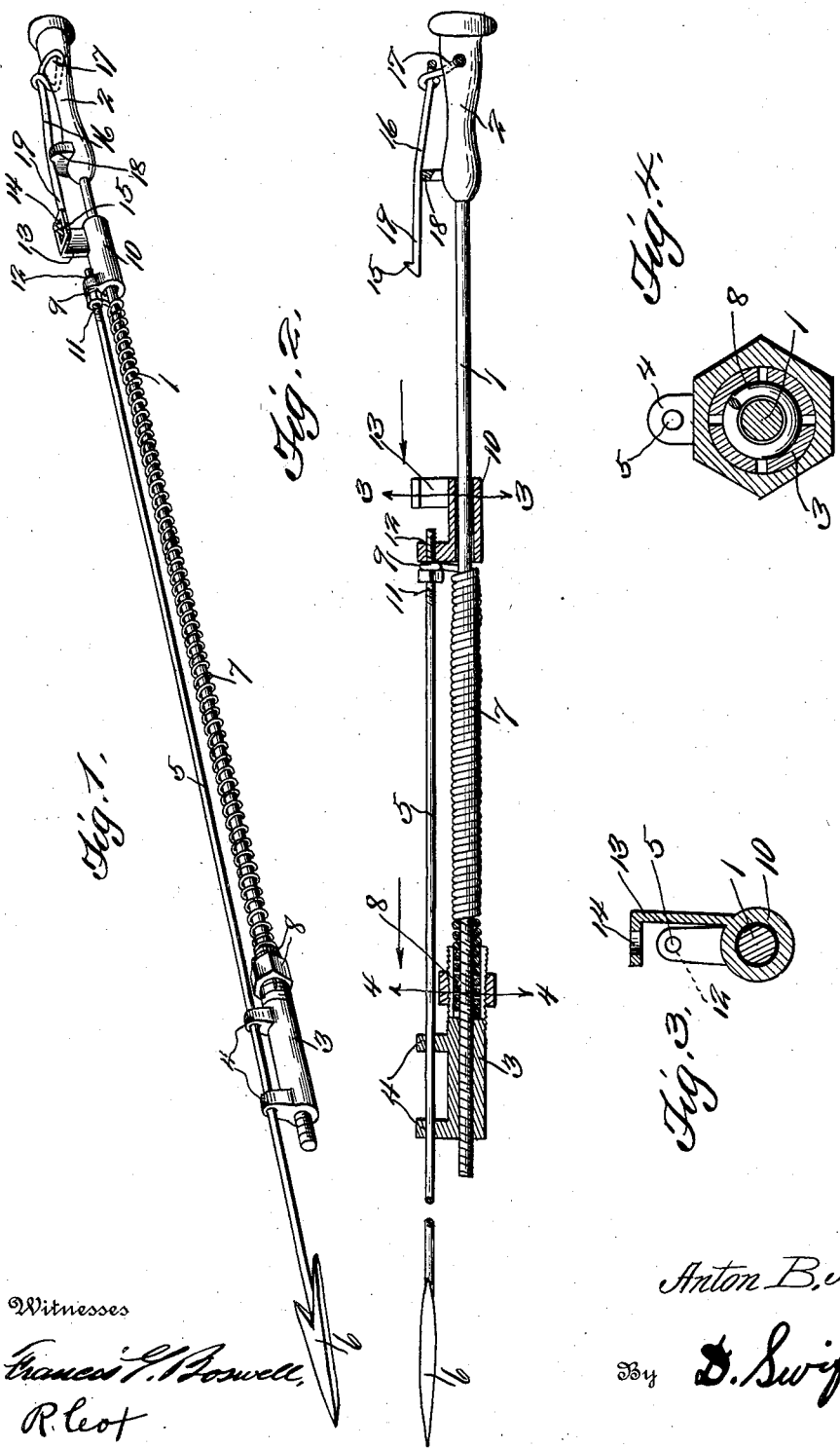
A. B. NEUMAN.
FISH SPEAR.
APPLICATION FILED JUNE 3, 1911.
1,009,553.
Patented Nov. 21, 1911.
Witnesses
Frances F. Boswell
R. Leot
Inventor
Anton B. Neuman,
By D. Swift &Co.
Attorney

ANTON B. NEUMAN, OF OSCEOLA, WISCONSIN.

FISH-SPEAR.

1,009,553.   Specification of Letters Patent.   Patented Nov. 21, 1911.

Application filed June 3, 1911. Serial No. 631,160.

*To all whom it may concern:*

Be it known that I, ANTON B. NEUMAN, a citizen of the United States, residing at Osceola, in the county of Polk and State of Wisconsin, have invented a new and useful Fish-Spear; and I do hereby declare the following to be a full, clear, and exact description of the invention, such as will enable others skilled in the art to which it appertains to make and use the same.

This invention relates to a new and useful fishing spear adapted for spearing fish, frogs, and other small game.

The invention aims as its primary object to provide a spring actuated spear, adapted to be held in a retracted position by novel means, which when released will permit the spear to be projected by the force of the spring into the body of the game.

In the drawings, there is only disclosed one form of the present invention, but in practical fields, this form may require alterations, to which the applicant is entitled, provided the alterations are comprehended within the scope of what is claimed.

The invention comprises further features and combination of parts, as hereinafter set forth, shown in the drawings and claimed.

In the drawings: Figure 1 is a view in perspective of a fishing spear constructed in accordance with the invention. Fig. 2 is a longitudinal view showing parts in section. Fig. 3 is a transverse sectional view on line 3—3 of Fig. 2. Fig. 4 is a sectional view on line 4—4 of Fig. 2.

Referring to the drawings, 1 designates an elongated metallic rod having a handle 2 at one end, and a sleeve 3 adjustably connected to the other end. The sleeve 3 is provided with guide loops 4, in which the spear rod 5 having a spear point 6 is guided. Surrounding the rod 1 is a coil spring 7, which completely closes, when the spear rod is extended. The spring at one end is secured to the sleeve 3, as shown at 8, while the other end of the spring is secured as at 9 to a one piece sleeve 10, to which the end 11 of the spear rod is connected as shown at 12. This sleeve 10 is provided with an overhanging lug 13 having an aperture 14, adapted to be received by the hooked end 15 of the pivoted lever 16. This lever at one end is turned into a loop, which is connected to the handle of the rod 1, as shown at 17. When the hooked end of the lever is in engagement with the aperture of the overhanging lug, the lever is disposed against a raised portion or rib 18, which constitutes means for holding the hooked end in engagement with the aperture of the lug, as shown in Fig. 1. When it is desired to release the spear rod, the portion 19 beyond the raised portion of the handle is depressed, thus withdrawing the hooked end of the lever from engagement with the aperture of the lug. When the portion 19 is so depressed, the spring is allowed to contract upon itself, so as to permit the spear rod to be projected into the body of the game.

From the foregoing, it will be clearly manifest that there has been devised a novel, efficient, simple and practical fishing spear, and one which will be exceedingly useful to fishermen and the like.

The invention having been set forth, what is claimed as new and useful is:

1. In combination, a rod having a handle at one end, and a sleeve adjustably secured to the other end, said sleeve having guide loops and constituting means for adjusting the position of a spring on the rod, a spear rod movable through the loops, a coil spring surrounding the first rod, having one end clamped to the sleeve, while the other end is connected to one end of the spear rod, a latch lever having a loop connection with the handle and provided with a hooked spring end, the end of the spring that is connected to the spear rod having means to be engaged by the hooked end, said handle having a raised portion to be engaged by the latch lever, thus enforcing spring action into the hooked end of the latch lever.

2. In combination, a rod, having a handle at one end, and a sleeve adjustably secured to the other end, said sleeve having guide loops and constituting means for adjusting the position of a spring on the rod, a spear movable through the loops, a coil spring surrounding the first rod, having one end clamped to the sleeve, while the other end is clamped to a one piece sleeve having an overhanging lug provided with an aperture, said sleeve having the overhanging lug being connected to the spear rod, a latch lever having a loop connection with the handle, and provided with a hooked spring end, to engage the aperture of the said overhanging lug, said handle having a raised portion to be engaged by the latch lever, thus enforcing spring action into the hooked end of the latch lever.

3. In combination, a rod having a handle at one end and loops at the other, a spear rod passing through the loops, a coil spring surrounding the rod and anchored to the end having the loops, while the other end is clamped to a one-piece sleeve having an overhanging lug provided with an aperture, said one piece sleeve being connected to the spear rod, and a latch lever connected to the handle to engage the aperture of the overhanging lug.

4. In combination, a rod having a handle at one end and provided with a spring actuated spear rod arranged parallel thereto, the spring having connections with the spear rod, said connections comprising a one piece sleeve having an overhanging lug provided with an aperture, a latch lever connected to the handle and provided with a spring hooked end to engage the aperture of the lug.

5. In combination, a rod having a handle at one end and provided with a spring actuated spear rod arranged parallel thereto, a spring having connections with the spear rod, said connections comprising a one piece sleeve having an overhanging lug provided with an aperture, a latch lever having a loop connection with the handle and provided with a spring hooked end to engage the aperture of the lug, said handle having a raised portion to be engaged by the latch lever, thus enforcing spring action into the hooked end of the latch lever.

In testimony whereof I have signed my name to this specification in the presence of two subscribing witnesses.

ANTON B. NEUMAN.

Witnesses:
　JOHN E. DEMULLING,
　LEO M. DEMULLING.